United States Patent
Steer et al.

(10) Patent No.: US 7,453,832 B2
(45) Date of Patent: Nov. 18, 2008

(54) TRANSIT LINK COORDINATION SYSTEMS AND METHODS FOR A DISTRIBUTED WIRELESS COMMUNICATION NETWORK

(75) Inventors: David Steer, Nepean (CA); Adrian Smith, Kanata (CA); Koon Hoo Teo, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1138 days.

(21) Appl. No.: 10/682,089

(22) Filed: Oct. 10, 2003

(65) Prior Publication Data

US 2004/0157637 A1    Aug. 12, 2004

Related U.S. Application Data

(60) Provisional application No. 60/446,617, filed on Feb. 12, 2003, provisional application No. 60/446,618, filed on Feb. 12, 2003, provisional application No. 60/446,619, filed on Feb. 12, 2003, provisional application No. 60/447,527, filed on Feb. 14, 2003, provisional application No. 60/447,643, filed on Feb. 14, 2003, provisional application No. 60/447,644, filed on Feb. 14, 2003, provisional application No. 60/447,645, filed on Feb. 14, 2003, provisional application No. 60/447,646, filed on Feb. 14, 2003, provisional application No. 60/451,897, filed on Mar. 4, 2003, provisional application No. 60/453,011, filed on Mar. 7, 2003, provisional application No. 60/454,715, filed on Mar. 15, 2003, provisional application No. 60/461,344, filed on Apr. 9, 2003, provisional application No. 60/461,579, filed on Apr. 9, 2003, provisional application No. 60/464,844, filed on Apr. 23, 2003, provisional application No. 60/467,432, filed on May 2, 2003, provisional application No. 60/468,456, filed on May 7, 2003, provisional application No. 60/480,599, filed on Jun. 20, 2003, provisional application No. 60/453,840, filed on Mar. 11, 2003.

(51) Int. Cl.
*H04B 7/005* (2006.01)
*H04L 12/56* (2006.01)

(52) U.S. Cl. .......................... 370/278; 370/328; 370/430

(58) Field of Classification Search ................ 370/320, 370/430, 468, 278, 282, 339, 328, 329; 455/522, 455/63.4; 725/112
See application file for complete search history.

(56) References Cited

U.S. PATENT DOCUMENTS 5,901,355 A    5/1999   Doner ........................ 455/447

(Continued)

FOREIGN PATENT DOCUMENTS

DE           4328061          8/1993

(Continued)

OTHER PUBLICATIONS

Ueda, T. et al; Evaluating the Performance of Wireless Ad Hoc Network Testbed With Smart Antenna; IEEE, 2002, pp. 135-139.

(Continued)

*Primary Examiner*—John Pezzlo
(74) *Attorney, Agent, or Firm*—Christopher & Weisberg, P.A.

(57) ABSTRACT

Systems and methods of coordinating transit links between network nodes in a wireless communication network are disclosed. Transit links between a network node and respective neighbouring network nodes are monitored for communications control signals from any of the neighbouring network nodes, and a particular transit link is selected for data exchange upon receipt of a communications control signal. Each transit radio link antenna beam at a network node is thereby aligned with a respective neighbouring network node when the neighbouring node sends a communications control signal.

46 Claims, 8 Drawing Sheets

U.S. PATENT DOCUMENTS

| | | |
|---|---|---|
| 7,333,458 B2 | 2/2008 | Cain |
| 2003/0035371 A1* | 2/2003 | Reed et al. .................. 370/230 |
| 2004/0082356 A1* | 4/2004 | Walton et al. ............... 455/522 |
| 2004/0157611 A1 | 8/2004 | Smith et al. |
| 2004/0157645 A1 | 8/2004 | Smith et al. |
| 2004/0176050 A1 | 9/2004 | Steer et al. |
| 2005/0041613 A1* | 2/2005 | Kuhl et al. .................. 370/320 |

FOREIGN PATENT DOCUMENTS

| | | |
|---|---|---|
| EP | 1063789 | 6/1999 |
| EP | 1404043 | 9/2002 |
| WO | 9946745 | 3/1999 |
| WO | 0070572 | 5/2000 |
| WO | 02078369 | 10/2002 |

OTHER PUBLICATIONS

Lal, Dhananjay et al; A Novel MAC Layer Protocol for Space Division Multiple Access in Wireless Ad Hoc Networks; IEEE, 2002, pp. 614-619.

Kalia, Manish, et al; Data Scheduling and SAR for Bluetooth MAC; IEEE, 2000, pp. 716-720.

Sanchez, Ricardo J.; RDRN: A Rapidly Deployable Radio Network—Implementation and Experience—; IEEE, 1998, pp. 93-97.

Johansson, Per; Bluetooth: An Enabler for Personal Area Networking; IEEE Network, Sep./Oct. 2001, pp. 28-37.

Nasipuri, A., et al.; A MAC Protocol for Mobile Ad Hoc Networks Using Directional Antennas; IEEE, 2000, pp. 1214-1219.

* cited by examiner

TRANSIT LINK COORDINATION SYSTEMS AND METHODS FOR A DISTRIBUTED WIRELESS COMMUNICATION NETWORK

CROSS-REFERENCE TO RELATED APPLICATIONS

This application claims priority from U.S. Provisional Patent Applications Ser. Nos. 60/446,617 and 60/446,618, both filed on Feb. 12, 2003. The entire contents of each of these provisional applications are hereby incorporated herein by reference.

This application is also related to the following Provisional Patent Applications filed in the U.S. Patent and Trademark Office, the disclosures of which are expressly incorporated herein by reference:

U.S. patent application Ser. No. 60/446,619 filed on Feb. 12, 2003 and entitled "Distributed Multi-Beam Wireless System Capable of Node Discovery, Rediscovery and Interference Mitigation" [15742]

U.S. patent application Ser. No. 60/447,527 filed on Feb. 14, 2003 and entitled "Cylindrical Multibeam Planar Antenna Structure and Method of Fabrication" [15907]

U.S. patent application Ser. No. 60/447,643 filed on Feb. 14, 2003 and entitled "An Omni-Directional Antenna" [15908]

U.S. patent application Ser. No. 60/447,644 filed on Feb. 14, 2003 and entitled "Antenna Diversity" [15913]

U.S. patent application Ser. No. 60/447,645 filed on Feb. 14, 2003 and entitled "Wireless Antennas, Networks, Methods, Software, and Services" [15912]

U.S. patent application Ser. No. 60/447,646 filed on Feb. 14, 2003 and entitled "Wireless Communication" [15897]

U.S. patent application Ser. No. 60/451,897 filed on Mar. 4, 2003 and entitled "Offsetting Patch Antennas on an Omni-Directional Multi-Facetted Array to allow Space for an Interconnection Board" [15958]

U.S. patent application Ser. No. 60/453,011 filed on Mar. 7, 2003 and entitled "Method to Enhance Link Range in a Distributed Multi-hop Wireless Network using Self-Configurable Antenna" [15946]

U.S. patent application Ser. No. 60/453,840 filed on Mar. 11, 2003 and entitled "Operation and Control of a High Gain Phased Array Antenna in a Distributed Wireless Network" [15950]

U.S. patent application Ser. No. 60/454,715 filed on Mar. 15, 2003 and entitled "Directive Antenna System in a Distributed Wireless Network" [15952]

U.S. patent application Ser. No. 60/461,344 filed on Apr. 9, 2003 and entitled "Method of Assessing Indoor-Outdoor Location of Wireless Access Node" [15953]

U.S. patent application Ser. No. 60/461,579 filed on Apr. 9, 2003 and entitled "Minimisation of Radio Resource Usage in Multi-Hop Networks with Multiple Routings" [15930]

U.S. patent application Ser. No. 60/464,844 filed on Apr. 23, 2003 and entitled "Improving IP QoS though Host-Based Constrained Routing in Mobile Environments" [15807]

U.S. patent application Ser No. 60/467,432 filed on May 2, 2003 and entitled "A Method for Path Discovery and Selection in Ad Hoc Wireless Networks" [15951]

U.S. patent application Ser. No. 60/468,456 filed on May 7, 2003 and entitled "A Method for the Self-Selection of Radio Frequency Channels to Reduce Co-Channel and Adjacent Channel Interference in a Wireless Distributed Network" [16101]

U.S. patent application Ser. No. 60/480,599 filed on June 20, 2003 and entitled "Channel Selection" [16146]

FIELD OF THE INVENTION

This invention relates generally to distributed wireless communication networks, and in particular to coordinating transit links between network nodes in such networks.

BACKGROUND OF THE INVENTION

In a distributed wireless communication network including network nodes communicating via transit radio links, it is often desirable to manage and to coordinate the transit radio links. One of the problems associated with coordinating the transit links is to organize a scheme in which each transit radio link beam at a network node is aligned with neighbouring network nodes and operating at a correct frequency channel and polarization to accept traffic from or send traffic to the neighbouring nodes. Generally, there is only one transit link transceiver in any node, such that the transit link transceiver must be shared among the beams, channels and polarizations and coordinated with the neighbouring nodes to operate the transit links.

One known coordination technique is to synchronize all network nodes and provide each network node with a common clock and means of identifying time slots. The nodes then organize the time slots and beams to coordinate their communications on the transit links. However, a synchronized approach requires distribution of a reference time between network nodes and maintenance of synchronized clocks in each node, which tends to be difficult in packet-based communication networks, for example. In addition, allowances in time slots for clock jitter that often affects synchronized systems significantly reduce efficiency. Similarly, smaller time slots reduce waste if a packet does not fill a slot, but the timing accuracy and resolution required for small time slots is difficult to achieve with uncoordinated nodes. Small slots are thus preferred to reduce waste time, but are harder to make.

Further, with fixed length or synchronized slots, network nodes are not easily able to reallocate unused portions of slots to other traffic to adapt to packet flow. In packet-based system, packets are not always the same length, and can arrive at different times and potentially along different transit paths, so there is no steady flow over each transit link. To facilitate flow of packets, a time slot is normally allocated to each transit link, but its capacity is wasted if there is no traffic for that transit link. This capacity cannot be easily reallocated to other links that have excess traffic.

A known synchronous transit link scheme is the point control function (PCF) of the IEEE 802.11 standard. Those skilled in the art will appreciate that "802.11" refers to a set of specifications, available from the Institute of Electrical and Electronics Engineers (IEEE), relating to wireless local area networks. This scheme requires the synchronization of all the nodes subtending to a single access point, the point controller or PC. The PCF is also designed only for an environment with a single access point AP with a number of subtending stations (STA), and is not applicable to multi-link or multi-hop distributed networks. Further, the PCF uses a general polling technique to discover traffic, which is inefficient in that nodes must be polled even if they have no traffic to send. Traffic is also delayed until the node is polled. In this scheme, any communication between nodes that is not overheard by all subtending nodes may adversely affect synchronization.

Asynchronous transit links avoid some of the above shortcomings of synchronized systems. With asynchronous transit links, however, there is a possibility that a network node will not receive service due to high levels of traffic on other neighbouring nodes. This may block the node from sending its traffic and hence its subscribers may not receive satisfactory service. In addition, asynchronous links are not well suited to the passage of packets that require regular transmission times and low jitter, such as packets for speech or video services. Such packets are often described as having Quality of Service (QoS) parameters, including, for example, maximum delay and maximum jitter in packet transmission times.

In asynchronous networks, some network nodes may also be "lost" to the network if their transit radio links are affected by interference from external radio operations or physical blockage of the beams, for example.

SUMMARY OF THE INVENTION

A method of coordinating a transit link between network nodes in a wireless communication network is provided according to an aspect of the invention. Transit links between a network node and respective neighbouring network nodes are monitored for a communications control signal from any of the neighbouring network nodes. The transit link between the network node and a neighbouring network node is selected when a communications control signal is received from the neighbouring network node, and is used for exchanging data between the network node and the neighbouring network node from which the communications control signal was received.

In a particular embodiment, a network node is operated in a neighbourhood mode to listen for the communications control signal from any of its neighbouring network modes, and then in a traffic mode for exchanging data with another network node.

According to another embodiment, a transit link is coordinated by setting a master network node and a slave network node for the transit link, setting a rendezvous time between the master network node and the slave network node, and sending a rendezvous signal from the master network node to the slave network node via transit link at the rendezvous time.

In accordance with another aspect of the invention, a network node for an asynchronous communication network includes a transit link antenna system, a transit radio connected to the transit link antenna system, and a communications controller. The transit radio communicates with neighbouring network nodes over transit links using the transit link antenna system. The communications controller operates the network node in a neighbourhood mode to listen for communications control signals from any of the neighbouring network nodes, and in a traffic mode to select one of the transit links and to exchange data with one of the neighbouring network nodes over the one of the transit links in response to a communications control signal from the one of the neighbouring network nodes.

The transit link antenna system preferably includes a neighbourhood mode antenna and a traffic mode antenna, each having a respective defined beam pattern. In one implementation, the transit link antenna system includes an array antenna having directional antenna elements, and each of the transit links is associated with one of the directional antenna elements. The communications controller then operates more than one of the directional antenna elements in the neighbourhood mode and selects one of the plurality of directional antenna elements in the traffic mode.

In a network node of a wireless communication network, a method of coordinating a transit link between the network node and a neighbouring network node in the wireless communication network is also provided in accordance with an embodiment of the invention. The network node is assigned as either a master network node or a slave network node for the transit link. Where the network node is the master network node, the network node schedules a rendezvous time for the transit link, transmits the rendezvous time to the slave network node for the transit link, and transmits a rendezvous signal to the slave network node at the rendezvous time. On the other hand, if the network node is the slave network node, then the network node receives the rendezvous time from the master network node for the transit link, listens to receive the rendezvous signal at the rendezvous time, and transmits a rendezvous response signal to the master network node upon receiving the rendezvous signal. The method may be repeated for any or all transit links between the network node and a plurality of neighbouring network nodes.

According to a broader aspect of the invention, a wireless network includes multiple wireless network nodes. Each wireless network node has a respective access radio and omni-directional access antenna providing communications services to mobile terminals, a respective transit radio and transit antenna system providing communications with other wireless network nodes, and a respective communications controller. The transit antenna system has a plurality of antenna segments, each producing a respective beam such that a 360 degree coverage is provided. The communications controller controls communications between pairs of mobile terminals through the access radio and the access antenna system, communications between a mobile station and another wireless network node through the access radio, the access antenna system, the transit radio, and a segment of the transit antenna system, and communications from a first other wireless network node to a second other wireless network node through the transit radio and pairs of the segments of the transit antenna system.

Systems and methods of coordinating transit links in asynchronous communication systems are thereby provided. Transit link coordination is enabled in embodiments of the invention by monitoring transit links for incoming communications control signals, by listening for a rendezvous signal at prearranged or predetermined times, or both.

Other aspects and features of the present invention will become apparent to those ordinarily skilled in the art upon review of the following description of the specific embodiments of the invention.

BRIEF DESCRIPTION OF THE DRAWINGS

The invention will now be described in greater detail with reference to the accompanying diagrams, in which.

DETAILED DESCRIPTION OF PREFERRED EMBODIMENTS

Figure 1:
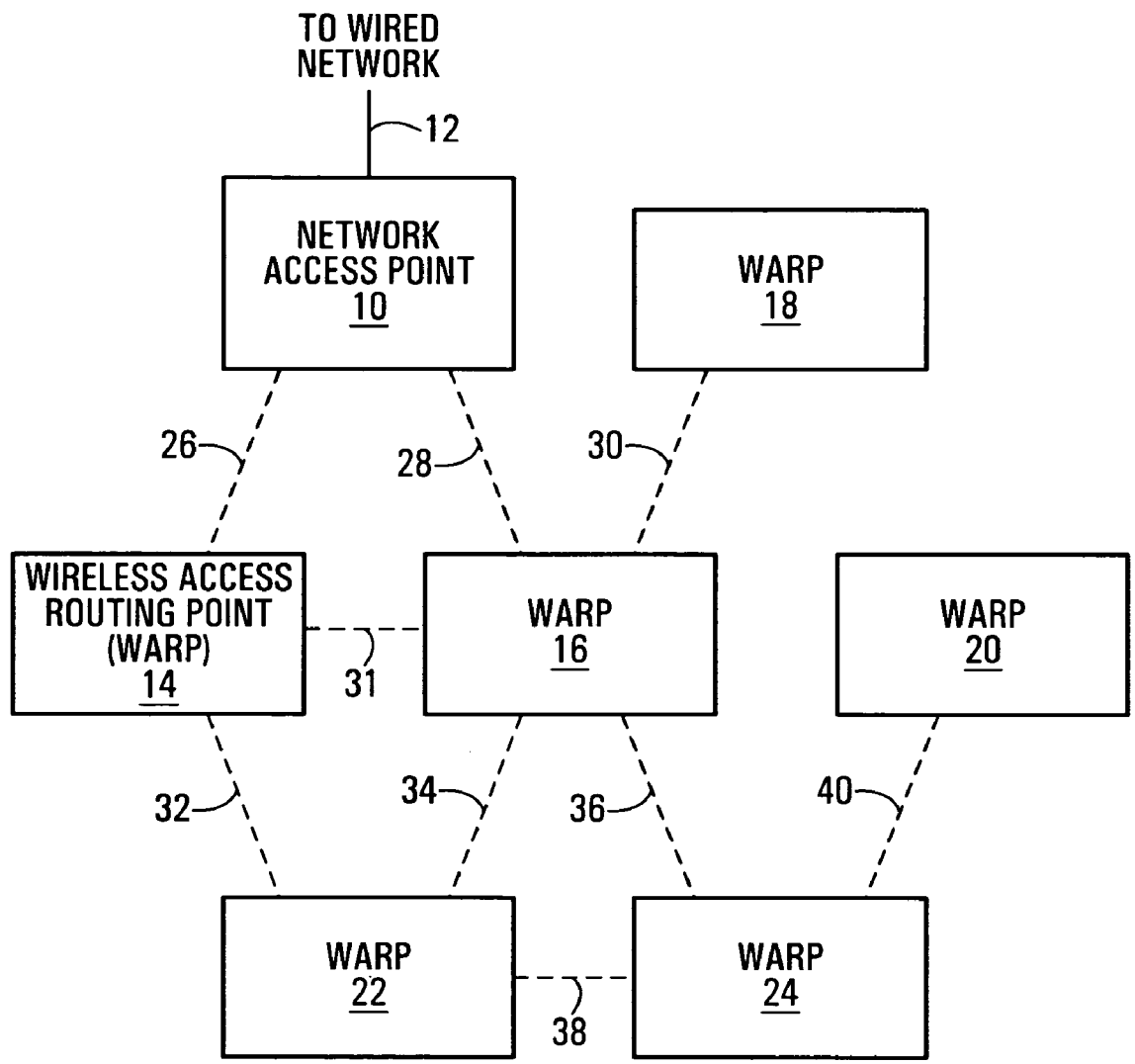
FIG. 1 is a block diagram of a distributed wireless communication network.

FIG. 1 is a block diagram of a distributed wireless communication network, in which the present invention may be implemented. The wireless communication network comprises a network access point (NAP) 10, connected to a wired network via a connection 12, a plurality of wireless access routing points (WARPs) 14, 16, 18, 20, 22, and 24, and a plurality of wireless transit links 26, 28, 30, 31, 32, 34, 36, 38, and 40. The network shown in FIG. 1 is one example of the type of communication network to which the present invention is applicable. The invention is in no way restricted to the particular network of FIG. 1, and may be implemented in other types of networks having different numbers and types of network nodes, for instance.

The purpose of the communication network shown in FIG. 1 is to enable subscribers with suitable terminals to receive various services by accessing the network. For the sake of simplicity, the network is depicted as having a number of WARPs 14-24 that are distributed about a region to be covered, and are linked together with transit radio links 26-40 and to a further communication network, a wired communication network in FIG. 1, through a connection 12. As shown, the NAP 10 is a network node that is connected to a wired backbone network such as the Internet through the connection 12, typically a broadband wireline connection.

The WARPs 14-24 support both network access and transit capabilities. Access capabilities are preferably afforded by the provision of one or more antennas for communication with wireless terminals of a variety of different types, including wireless enabled personal digital assistants (PDAs), personal computers, and hybrid telephony-data terminals, for example. In some implementations, these antennas are in the form of omni-directional antennas or arrays of directional antennas arranged to provide up to 360 degree coverage. Two or more access antennas are often provided at each node for diversity purposes. Whereas omni-directional antennas typically provide broader coverage with a single antenna element, directional antennas or arrays tend to have higher gain and can provide a more focused access coverage area if desired.

On the other hand, transit capabilities are preferably enabled using an array of directional antennas that provide for directional communication with other network nodes or, for example, wireless backhaul. An antenna array may comprise as few as two antenna elements, although arrays of six or more antennas are more common to afford a reasonable degree of directional association for each antenna. The number of antenna elements required to provide a full 360 degrees of transit link coverage for a network node increases with the directionality of the antenna elements in the array antenna at that node. That is, the more directional the antenna elements in the array, the greater the number of elements required to provide 360 degree coverage. The antenna elements of a directional array are also preferably arranged to include diversity, in the form of space or polarization diversity. Polarization diversity has the advantage that a more compact array may be implemented. In another embodiment, a network node is provided with an auxiliary transit link antenna having higher gain, directionality, and/or data rate than other transit link antenna elements.

Wireless terminals communicate with the nearest network node, the WARPs 14-24 and possibly the NAP 10 where the NAP 10 also supports access functionality, using access radios. The WARPs 14-24 route traffic throughout the network, and possibly outside the network through the NAP 10, via transit links 26-40. Traffic is also forwarded, as necessary, between the WARPs 14-24 to reach wireless terminals within the network.

Access and transit functionality is co-located in each WARP in FIG. 1. Although WARPs 14-24 represent network nodes in which access and transit functionality are co-located, the present invention is in no way limited to such nodes. Communication with, and among, dedicated transit nodes is also contemplated. The transit link coordination systems and methods described herein are applicable to virtually any type of network node.

As described briefly above, transit links are preferably coordinated such that each transit link beam at a network node is aligned with neighbouring network nodes. Transit link coordination according to other embodiments of the invention as described herein also provide for dynamic transit link capacity adaptation and scheduled rendezvous or contact between network nodes to thereby prevent, or at least reduce the likelihood of, loss of contact between a network node and the network.

One approach to transit link coordination, also described briefly above, is to synchronize network nodes. However, synchronous techniques have several inherent drawbacks. Establishing and maintaining synchronization between nodes is difficult in packet data systems or other communications systems with bursty or otherwise irregular traffic. In a packet radio system, for example, there is no continuous transmission between network nodes, and hence no continuous coordination of clocks is possible. Also, there tends to be significant jitter in transmission times because delays for the packet transmission are unknown, thus making it difficult for a receiver to establish timing by listening to its neighbours. Synchronization in this environment is not impossible, but is technically complex and typically very expensive. Usually, in a system for synchronization where the links are affected by jitter, a very stable, and consequently expensive, local oscillator is needed at each node to filter out the effects of the jitter in synchronization signals. Such systems also take time to come into synchronization. The time synchronization is thus difficult to achieve and maintain to the degree of accuracy necessary for optimal system performance.

The required synchronization accuracy amounts to a small but finite fraction of the time it takes to send a packet between network nodes. For a 2 Kbyte packet using a 20 Mbit/s radio throughput rate, for example, the packet transmission time is on the order of about 900 microseconds. However, jitter on the available transmission can be on the order of several tens of microseconds to several hundred microseconds, due to 802.11 MAC protocols and channel sensing, for instance.

Thus, jitter can be a significant fraction of the packet transmission time, and as such any allowance in the time slots for jitter significantly reduces efficiency. In addition, relatively small time slots, about 0.5 milliseconds for the above example throughput rate, are desirable to avoid waste if a packet does not fill the slot but difficult to achieve with uncoordinated network nodes.

Link capacity reallocation also remains a challenge with fixed length or synchronized time slots.

Transit link coordination techniques according to aspects of the invention provide for alignment of transit link beams between neighbouring network nodes, and scheduled contact or rendezvous between network nodes. Scheduled node contact provides for exchange of traffic having QoS requirements without a need to introduce a fully synchronous operation. Where contact between network nodes is scheduled and thus expected, loss of a network node is detected much more quickly than in asynchronous networks. Distributed implementation of transit link coordination at each network node as described below also avoids any requirement for a central network coordination manager for transit link coordination in an asynchronous system.

Figure 2:
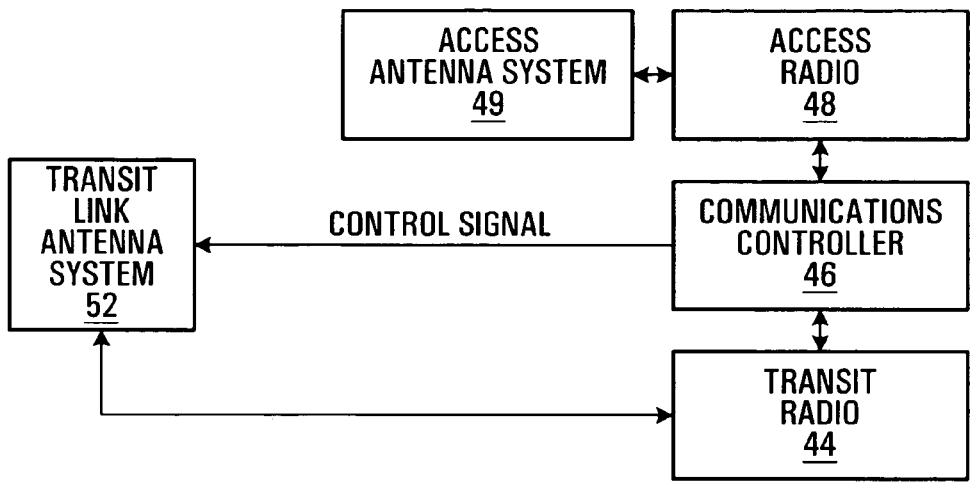
FIG. 2 is a block diagram of a wireless access routing point in accordance with an embodiment of the invention.

FIG. 2 is a block diagram of a wireless access routing point in accordance with an embodiment of the invention. Each of the WARPs 14-24 of FIG. 1 preferably has a similar structure to the WARP shown in FIG. 2.

The WARP in FIG. 2 comprises an access radio 48 connected to an access antenna system 49 that preferably includes space or polarization diversity, a communications controller 46 connected to the access radio 48, a transit radio 44, and a transit antenna system 52 that is also connected to the transit radio 44. A WARP may also include further components that have not been shown in FIG. 2 to avoid congestion in the drawing.

The access radio 48 and the access antenna system 49 support a network access function for wireless terminals (not shown) located within an access coverage area of the WARP. The access radio 48 performs such operations as communication signal frequency conversion, filtering, encoding and decoding, and modulation and demodulation, for example. The access antenna system 49 transmits communication signals to and receives communication signals from wireless terminals, and comprises either a single antenna element or multiple antenna elements such as main and diversity antenna elements.

The operation of the communications controller 46 is dependent upon the design and configuration of the WARP. Generally, a communications controller handles such control functions as routing of communication signals between the transit radio 44 and the access radio 48 and control of scanning operations by the transit radio 44 and the access radio 48. In one example embodiment, the communications controller 46 receives packets from the access radio 48, stores them briefly in suitable memory if needed, determines an appropriate transit radio link for a destination or a next hop in a path to a destination, and forwards the packets through the selected transit radio link via the transit radio 44.

The communications controller 46 also determines an appropriate one of a plurality of transit link operating modes and provides a control signal to the transit link antenna system 52. In accordance with an aspect of the invention described in further detail below, the communications controller 46 selects a first operating mode to listen for incoming traffic or communication control signals such as packet requests or connection requests, for example, and then switches to a second operating mode in which traffic is routed over transit links.

The transit radio 44 performs operations similar to those of the access radio 48, to support transit links to one or more other WARPs. However, the access radio 48 and the transit radio 44 typically employ different frequency bands, and possibly different encoding and modulation schemes. For example, in one embodiment, the access radio 48 is an 802.11b/g module operating at 2.4 GHz, whereas the transit radio 44 is an 802.11a module operating in the bands between 5.15 and 5.85 GHz. It is to be appreciated, however, that the present invention is applicable to other sets of frequencies for one or both the access and transit functions and to other radio system standards, such as IEEE 802.16a.

The transit link antenna system 52 transmits and receives communication signals over wireless transit links, as described in further detail below. In order to mitigate co-channel interference arising from multiple simultaneous transmissions over several transit links, directional antennas are preferably employed in the transit link antenna system 52 for the transit radio links. Directional antennas provide two useful properties: increased gain, which provides greater range, and directional azimuth and elevation beam patterning, which provides attenuation to unwanted co-channel and adjacent channel interferers.

Figure 3:
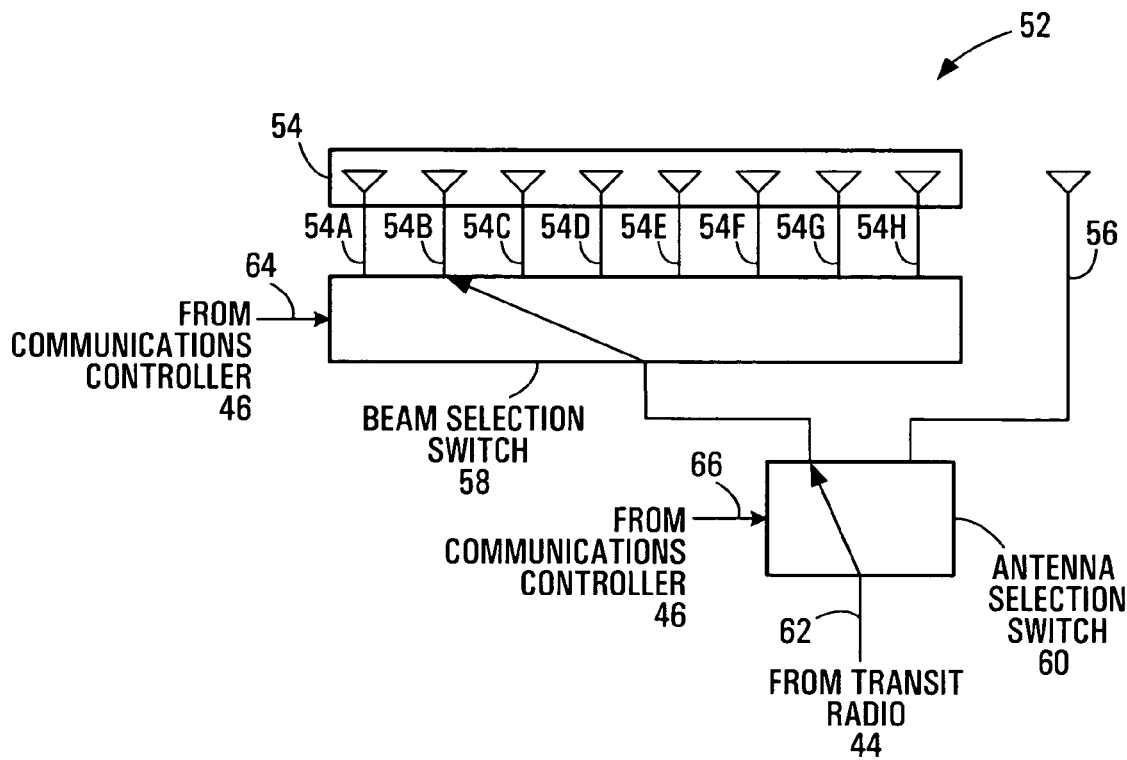
FIG. 3 is a block diagram of an example implementation of the transit link antenna system 52 of FIG. 2.

FIG. 3 is a block diagram of an example implementation of the transit link antenna system 52 of FIG. 2. The example antenna system shown in FIG. 3 includes an array antenna 54 having a plurality of directional antenna elements 54A-54H connected to a beam selection switch 58. The beam selection switch 58 is connected to an antenna selection switch 60, which is also connected to an omni-directional antenna 56 and a feeding port 62. The switches 58 and 60 are connected to receive control signals 64 and 66, respectively, from the communications controller 46.

In one embodiment, the omni-directional antenna 56 is in the form of a separate antenna with omni-directional coverage and space or polarization diversity. One drawback of using the omni-directional antenna 56 is the loss of transit link gain relative to a directional antenna. A typical gain of an omni-directional antenna is about 5 dBi, as compared with a 15 dBi typical gain for a directional antenna. However, this can be overcome with the use of lower data rates or lower modulation index for communications in an operating mode in which the antenna 56 is selected. The IEEE 802.11 standard, for instance, has adaptable data rates and modulation.

Embodiments using a separate omni-directional antenna 56 have the further disadvantage of requiring a separate structure and antenna selection switch 60. This may increase the size of the antenna system and make the antenna system less visually appealing. In a preferred embodiment, signals from the multi-element array of directional antennas 54 are combined such that a substantially omni-directional coverage pattern is achieved. This eliminates the need for an extra structure (the omni-directional antenna 56 and the antenna selection switch 60 in the example of FIG. 3) and improves the visual appeal of the unit. The combining of the signals may be performed, for example, by the beam selection switch 58 through the addition of additional switching elements (not shown). Such combiners are well known in the art. Although such combining introduces some loss in the signals, it can achieve a gain of the same order as the gain of a separate omni-directional antenna. It should be understood that either a separate omni-directional antenna system or an omni-directional antenna formed as a combination of directional antennas may be used in conjunction with the present invention.

In a further example alternative embodiment, a steerable array antenna is implemented in the transit link antenna system 52. Phase weights or complex weights including both phase components and amplitude components, required to steer a peak in an away antenna gain pattern toward a neighbouring network node, are determined. In a preferred implementation of this embodiment, a network node stores a lookup table that includes phase weights or complex weights for each transit link with each of its neighbouring network nodes. When a transit link with a neighbouring network node is selected at the network node, the phase weights or complex weights for that transit link are determined and applied to excitation signals of the array antenna to steer a beam of the array antenna toward the neighbouring network node. Further details of beam steering are provided in the co-pending U.S. patent application Ser. No. 10/682,090, entitled "System And Method Of Operation Of An Array Antenna In A Distributed Wireless Communication Network", filed of even date herewith, the entire contents of which are hereby incorporated by reference.

In another embodiment, the transit link antenna system 52 includes an auxiliary antenna port for connection to an auxiliary antenna. An auxiliary antenna may provide, for example, one or more of higher gain, a higher degree of directionality, and a higher data rate than other transit link antenna elements. An antenna detector, in the communications controller 46 or the transit link antenna system 52, for example, is configured to automatically detect whether or not an auxiliary antenna is coupled to the auxiliary antenna port. When detected, the auxiliary antenna is treated as another transit link antenna element or segment. The co-pending U.S. patent application Ser. No. 10/682,092, entitled "Method And Apparatus For Enhancing Link Range In A Wireless Network Using A Self-Configurable Antenna", filed of even date herewith, provides further details of such an auxiliary antenna. The entire contents of that co-pending application are hereby incorporated by reference.

Transit link coordination techniques according to aspects of the invention are applicable to transit links established using steerable array antennas, auxiliary antennas, and other types of antennas or elements that may be implemented in the transit link antenna system 52. That is, the present invention is not dependent upon any particular type of transit link antenna system.

In FIG. 3, the antenna selection switch 60 routes excitation signals, which include both received and transmitted signals, between the feeding port 62 and either the beam selection switch 58 or the omni-directional antenna 56, under the control of the antenna selection signal 66 from the communications controller 46. Similarly, the beam selection switch 58 routes excitation signals between the antenna selection switch 60 to one of the plurality of directional antenna elements 54A-54H of the array antenna 54, as directed by the beam selection signal 64.

It will be apparent from FIGS. 2 and 3 that the control signal from the communications controller 46 may include multiple components or control signals. In the example transit link antenna system shown in FIG. 3, the communications controller 46 generates the antenna selection signal 66 to select between the array antenna 54 and the omni-directional antenna 56 and the beam selection signal 64 to select one of the plurality of directional antenna elements 54A-54H. The effects of each selection signal and thus mode selection will become apparent from FIGS. 4 and 5 and the following description thereof.

Figure 4:
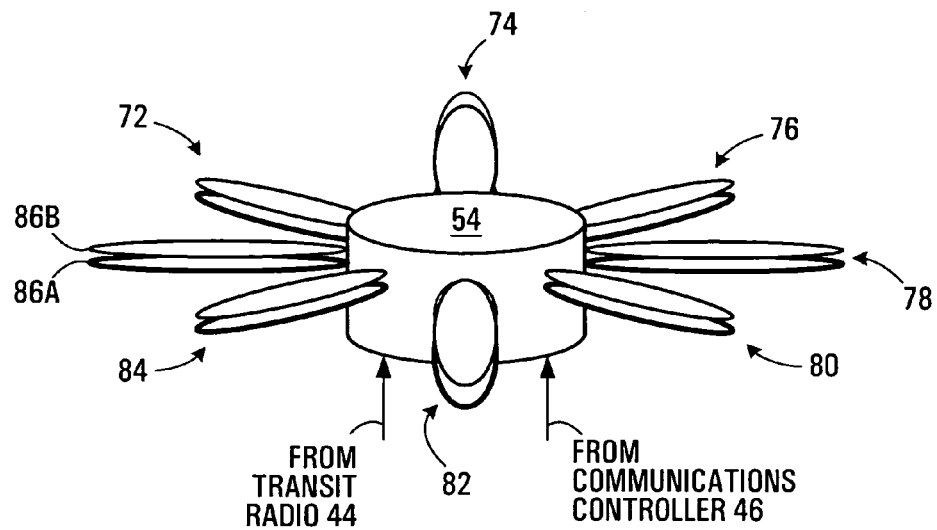
FIG. 4 is a line diagram illustrating an example transit link beam pattern for the transit link antenna system of FIG. 3.

FIG. 4 is a line diagram illustrating an example transit link beam pattern for the transit link antenna system of FIG. 3. As shown, the array antenna 54 produces eight orthogonally polarized beams 72-86B. The vertically and horizontally polarized beams are designated separately, as 86A and 86B, for only one of the beams so as to avoid congestion in the drawing. The array antenna 54 is also depicted in FIG. 4.

Figure 5:
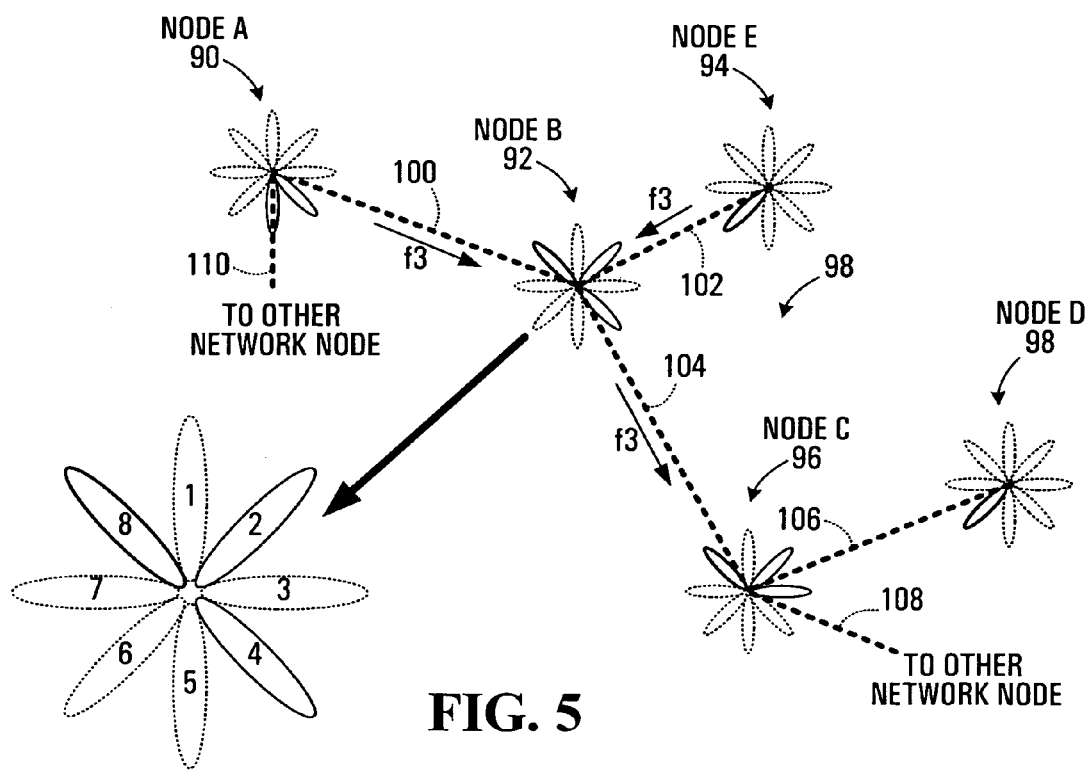
FIG. 5 is a line drawing illustrating transit links between network nodes and one example of associated network node beam patterns.

FIG. 5 is a line drawing illustrating transit links between network nodes and one example of associated network node beam patterns. In FIG. 5, a plurality of network nodes 90, 92, 94, 96, and 98, each having a transit link beam pattern similar to that of FIG. 4, is shown. The transit links 100, 102, 104, 106, 108, and 110 are established using one or more of the beams associated with neighbouring network nodes. The beam pattern at node B (92) has been shown in detail, with the eight beams numbered sequentially 1 through 8. This beam numbering scheme is used for all of the network nodes in the following description. However, the invention is not limited to any particular number or shape of transit link beams. For example, the techniques disclosed herein may be implemented in network nodes having a greater or lesser number of beams, in accordance with the extent of directionality that is desired for each beam. Moreover, the individual beam pattern can vary from elongated lobes, and need not be identical to one another.

Referring now to FIGS. 3 and 5, it will be apparent that, in this embodiment, each of the transit link beams at each network node in FIG. 5 is produced by an associated one of the antenna elements 54A-54H in the array antenna 54. In order to transfer traffic over a transit link, the network nodes at the ends of the transit link must select the correct transit link beam and frequency, at the same time. For the link 100, for example, beam 4 of node A must be coordinated with beam 8 of node B. The other transit links 102-110 require coordination of transit links in a similar manner.

In asynchronous communication networks such as packet data systems, network nodes transmit and receive radio signals when they are sending or receiving packets. The rest of the time, they are quiescent, "listening" for traffic and occasionally exchanging signalling messages for administration of the communication network. Unless some type of transit link coordination is also provided for detecting traffic from other network nodes, pending traffic from neighbouring nodes can be delayed, or in a worst case not detected and delivered at all. In addition, some network nodes may become "lost" to the network. Therefore, in accordance with embodiments of the invention, network nodes have a plurality of operating modes, as will be described in further detail below.

Figure 6:
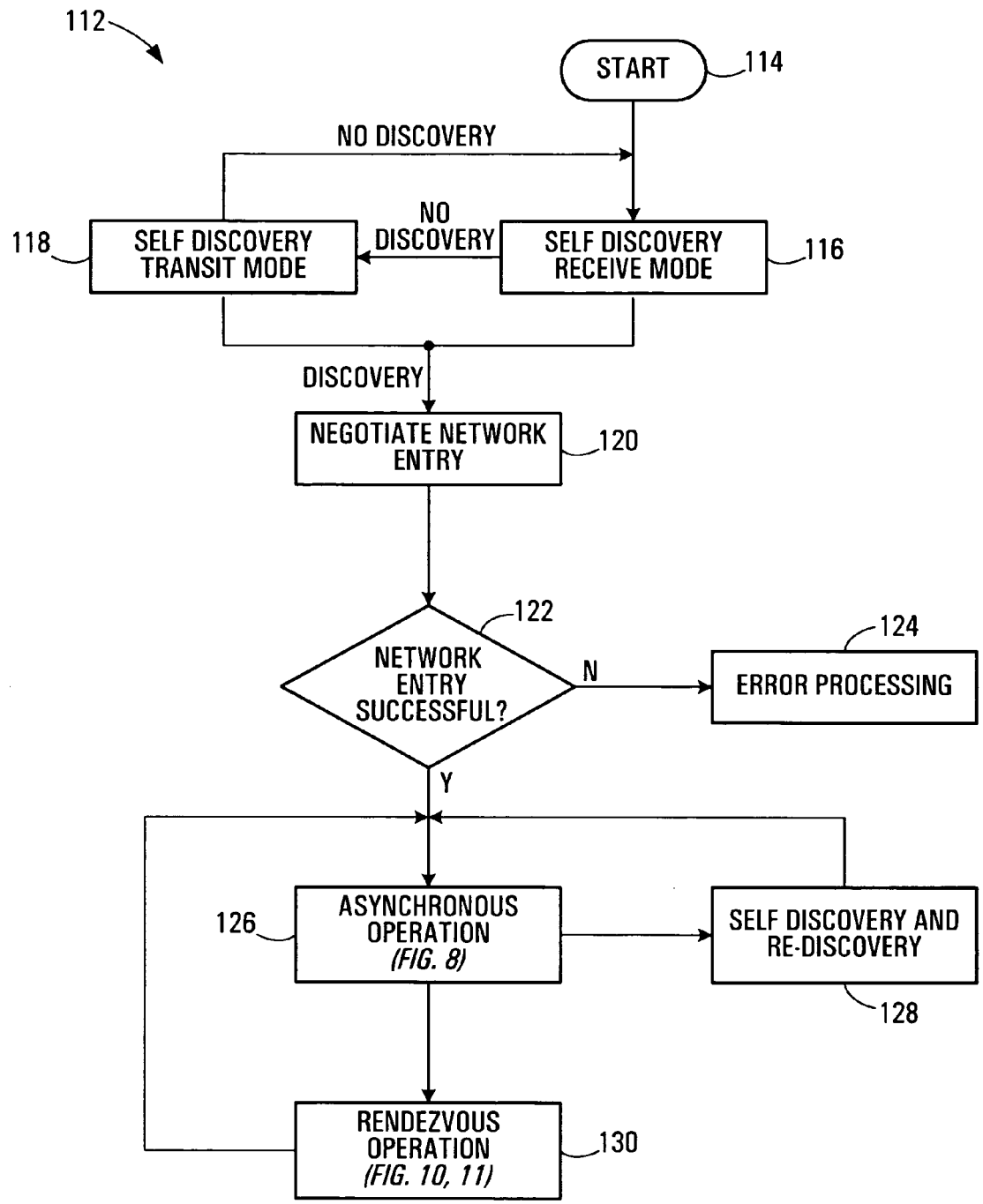
FIG. 6 is a flow diagram of a method of operating a network node according to aspects of the invention.

FIG. 6 is a flow diagram of a method of operating a network node according to aspects of the invention. Although the present invention relates primarily to the asynchronous operation (126) and rendezvous operation (130), other operations have been included in FIG. 6 to provide a more complete overview of network node functions, and a better appreciation of the effects of the invention on network node operation. It should be appreciated, however, that the other operations are shown in FIG. 6 solely for illustrative purposes. Coordination of transit links as disclosed herein is substantially independent of other network node operations.

The method begins at 114, when a network node is first installed and powered on. In an initial network self discovery receive mode 116, the network node listens for neighbouring nodes. If no other nodes are heard, then the network node is the first in the neighbourhood, and the new node transitions to a self discovery transmit mode 118, during which the new node transmits signals that allow later-installed network nodes to find it and form a network. Where other network nodes are heard, either in the receive mode or in response to the signals transmitted in the transmit mode, the network node negotiates its entry into a network with the other network nodes at 120. In the event that network entry fails, as determined at 122, error processing is performed at 124. Error processing may include such operations as providing a failure indication on a control terminal, retrying network entry, logging the failure in memory, logging parameters of an "unfriendly" neighbouring network node with which network entry is not permitted for commercial reasons so that network entry with that node is not retried, and the like. Other error processing schemes will be apparent to those skilled in the art. Although not shown explicitly shown in FIG. 6, the network node may revert back to discovery operations at 116 or 118 after the error processing at 124.

Figure 8:
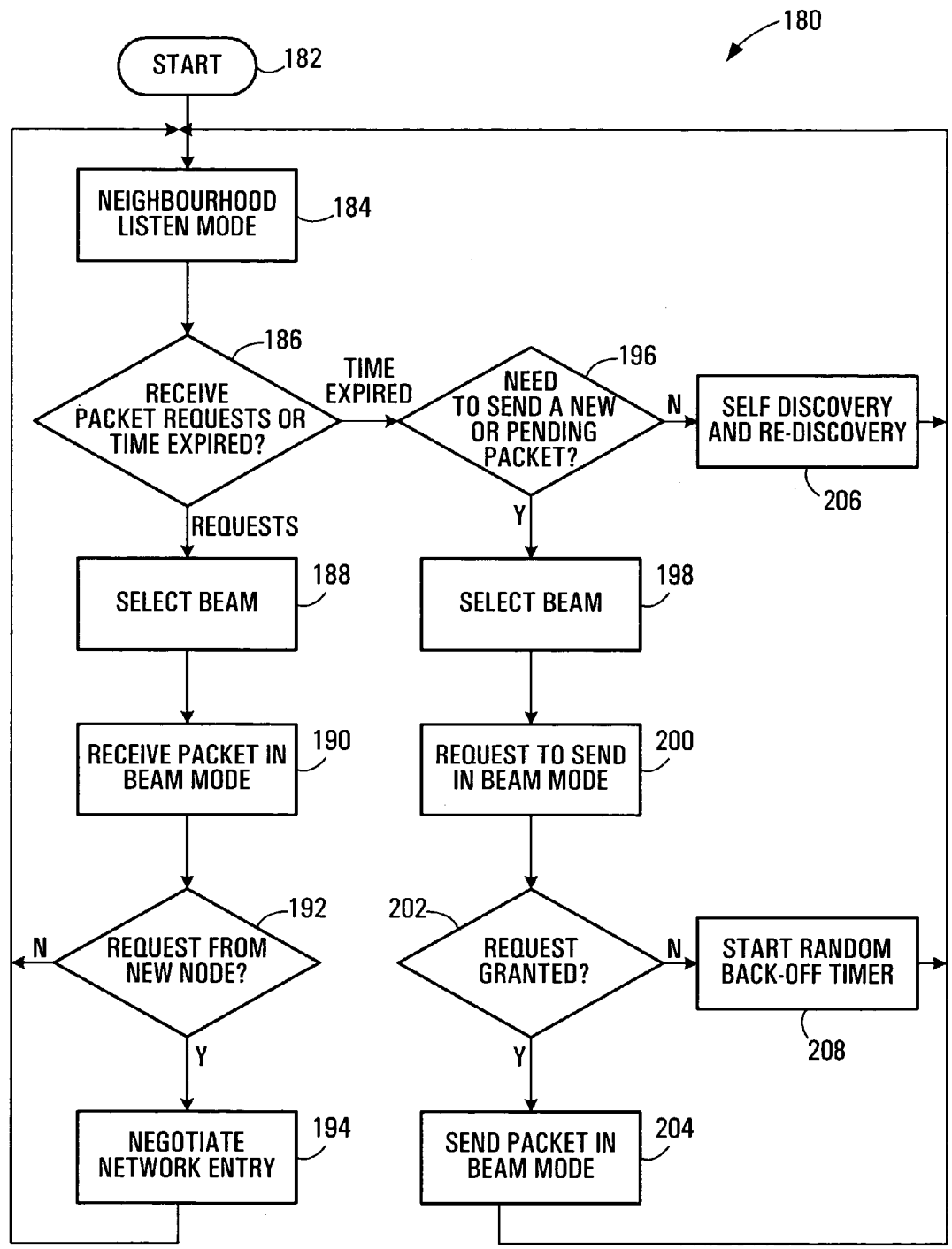
FIG. 8 is a flow diagram of a method of coordinating asynchronous transit links according to an embodiment of the invention.

After the network node has connected to the network, the method proceeds to an asynchronous operating mode at 126, which, as indicated, is illustrated in further detail in FIG. 8. Neighbourhood listening and traffic transfer, embodying transit link coordination according to an aspect of the invention, are effected in this operating mode. During network node listening and traffic transfer operations, the network node may revert to a self discovery and rediscovery mode at 128, in which discovery operations substantially similar to those described above are performed, or a rendezvous mode at 130, in which the network node schedules contact with other network nodes over a transit link according to another aspect of the invention. Scheduled network node contact or rendezvous, described in further detail below with reference to FIGS. 10 and 11, supports QoS traffic, reduces the likelihood of a network node becoming lost to the network, and may also reduce traffic delays under certain operating conditions.

Thus, asynchronous operation at 126 and rendezvous operation at 130 involve aspects of the present invention. Although discovery operations may be desirable, to simplify distributed network configuration, transit link coordination and other aspects of the invention are in no way restricted to network nodes enabled for self discovery and/or re-discovery. Further details of self discovery and re-discovery techniques are provided, for example, in the co-pending United States patent application Ser. No. 10/682,084, entitled "Distributed Multi-Beam Wireless System", filed of even date herewith, the entire contents of which are hereby incorporated by reference.

According to one aspect of the invention, a network node has a neighbourhood mode and a traffic mode. This aspect can be considered an implementation of the asynchronous operation 126 of FIG. 6. In the neighbourhood mode, a network node listens to its neighbouring nodes to receive requests for transmission of packets or analogous connection or communication request signals, whereas in the traffic mode, the network node transmits and/or receives traffic packets over a transit link. In one embodiment, an omni-directional antenna is selected for the neighbourhood mode to provide a wide degree of coverage with a single antenna structure. A directional antenna element, such as one element in an array antenna comprising a plurality of antenna elements, is preferably selected in the traffic mode. The network node also includes means for switching between these two modes of operation. Referring to FIGS. 2 and 3, for example, the communications controller 46 controls the antenna selection switch 60 to select the omni-directional antenna 56 in the neighbourhood mode, and to select the array antenna 54 in the traffic mode. In the traffic mode, the communications controller 46 further controls the beam selection switch 58 to select one of the antenna elements 54A-54H associated with the transit link to an intended destination network node.

Figure 7:
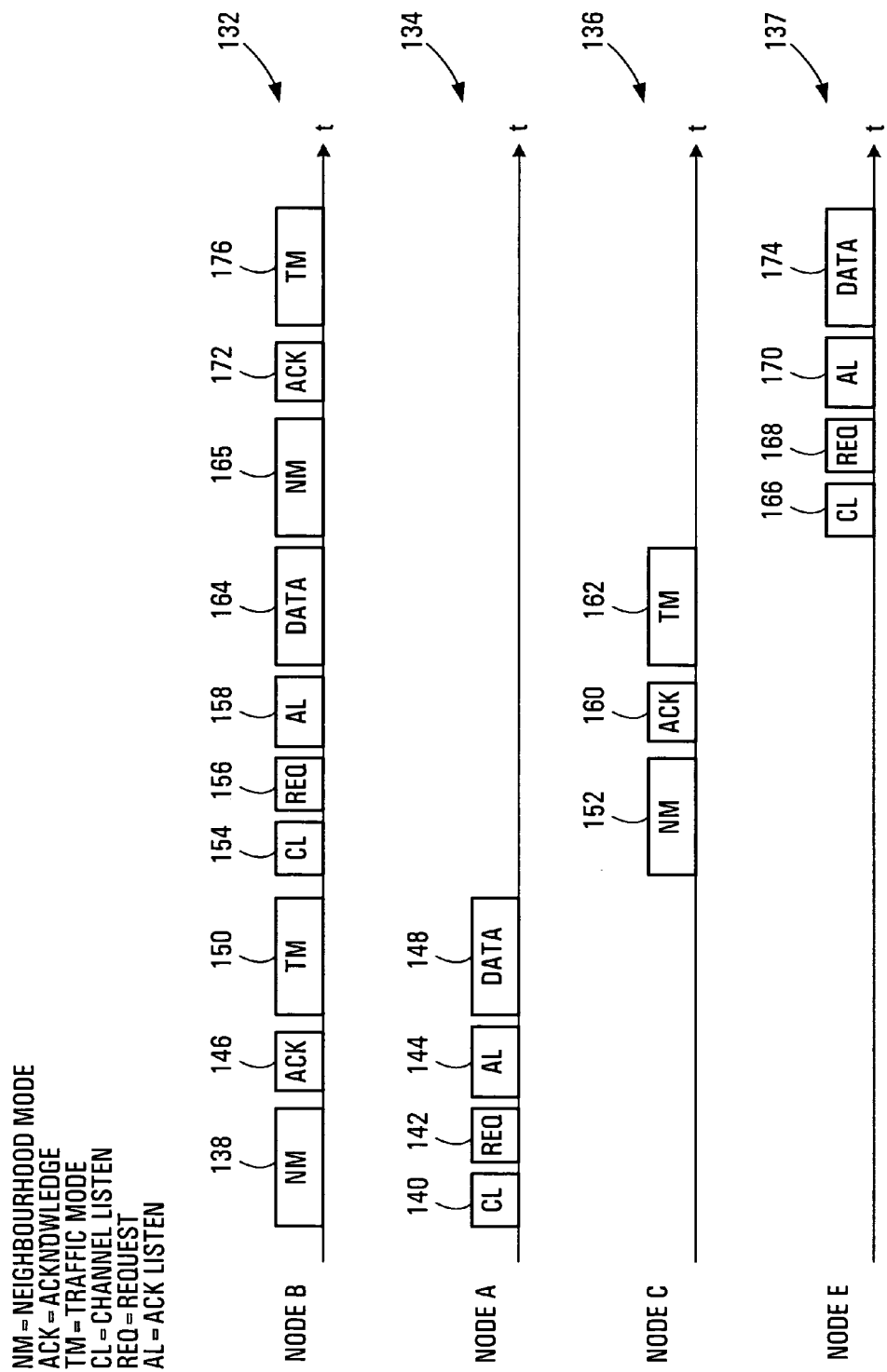
FIG. 7 is a timing diagram showing network node operations in accordance with an embodiment of the invention.

FIG. 7 is a timing diagram showing network node operations in accordance with an embodiment of the invention. In particular, FIG. 7 illustrates signal timing for the neighbourhood mode and the traffic mode described briefly above. The network nodes referred to in FIG. 7 are those shown in FIG. 5.

The timing diagram of FIG. 7 corresponds to one specific example of a signal exchange between network nodes. Other types and sequences of signal exchange, of course, exhibit somewhat different timing patterns. In FIG. 7, node B is initially in neighbourhood mode and node A has traffic to send to node B. Node B then has traffic to send to node C, and subsequently node E has traffic to send to node B. For simplicity, it is assumed that the transit links between node B and each of nodes A, C, and E use a frequency f3, as shown in FIG. 5.

When a network node has no traffic to send, it monitors the transit links among its neighbours using the neighbourhood mode until it either receives a request to receive traffic or it has new traffic of its own to send over a transit link. Traffic is received, for example, from a neighbouring network over a transit link or from a subscriber over an access link if the network node also supports access functionality. At the left-hand side of FIG. 7, 138 designates the neighbourhood mode at node B.

At 140, node A listens for an available channel on its transit link to node B. Node A, at this time, is in traffic mode. Where node A has a transit link antenna system comprising an array antenna, such as shown in FIG. 3, it selects the particular antenna element for the beam associated with the transit link to node B. Referring back to FIG. 5, beam 4 at node A is selected for the transit link 100 to node B.

An intended receiving network node, either a final destination network node or a next hop toward a final destination in a multi-hop system, is identified based on address information contained in the data to be transmitted, in the headers of packets, for example. When the receiving network node has been identified, the beam for the corresponding transit link is selected. In one embodiment, each network node uses a local lookup table or other mapping means to retrieve or determine the location of the appropriate beam for each of its neighbouring network nodes. Neighbouring node locations or transit link beam mappings may be manually determined and stored, for example, when a network node is installed in a network. In another embodiment, a network node is configured to discover its neighbouring network nodes as described above, and to populate a lookup table.

At 142, node A sends a request-to-send (RTS) packet or some other communications control signal to node B on the appropriate beam. Although node B is in neighbourhood mode in FIG. 7, an intended receiving node may be occupied with another beam when a control signal is transmitted, in which case a retry with random back-off may be employed, as one of various methods of dealing with a failure described below. Typically, control signals are sent with a low modulation index and low data rate to help ensure that the packet can be received at the intended receiving network node.

After node A transmits the communications control signal as shown at 144, node A listens for an acknowledgement of receipt of the signal from node B. In response to the signal, node B reverts to traffic mode, selects the appropriate beam, beam 8 in FIG. 5, and sends an acknowledgement signal such as a clear-to-send (CTS) packet to node A at 146. Nodes A and B may also exchange further signals such as packet sequencing data in accordance with an applicable protocol or standard, or possibly as extensions to a protocol, to establish a transit link. Beam selection at node B is substantially as described above for node A, based on identification information for node A in the communications control signal.

When the control signal has been acknowledged, both nodes A and B are in traffic mode, and node B listens (150) for traffic from node A on the selected beam. Node A transmits traffic (148), a packet for example, to node B. Although not explicitly shown in FIG. 7, node B may acknowledge receipt of traffic from node A. Other common communications operations may also be performed at nodes A and B. Upon completion of traffic transfer over the transit link, nodes A and B revert to neighbourhood mode, unless they have additional traffic to send.

At 154, node B has traffic to send to node C, which is in neighbourhood mode at 152. Similarly, at 166, node E has traffic to send to node B. Transit link coordination and traffic transfer between nodes B and C and between nodes E and B will be apparent from foregoing. Briefly, a control signal sent from node B at 156 is received at node C and acknowledged at 160. Node C enters traffic mode at 162. When the acknowledgement is received by node B at 158, traffic is transmitted to node C at 164. An available channel detected at 166 is used by node E to send a control signal 168 to node B, which is in neighbourhood mode at 165. Node B sends an acknowledgement at 172, which is received by node E at 170, and enters traffic mode at 176. Traffic is then transmitted to node B from node E at 174.

FIG. 8 is a flow diagram of a method of coordinating asynchronous transit links according to an embodiment of the invention, and provides a more general representation of neighbourhood mode and traffic mode, which are both part of the asynchronous operating mode as described above.

The method 180 begins at 182, when a network node has been added to a communication network or is ready to receive traffic, for example. At 184, the network node enters the neighbourhood mode. If packet requests, or other types of communications control signals, are received, as determined at 186, then the node enters the traffic mode and an appropriate transit link beam is selected at 188. Traffic, in the form a packet in the example of FIG. 8, is received over the transit link at 190. In the event that the network node receives communications control signals from more than one neighbouring network node during neighbourhood mode, then 188 and 190 are repeated for each neighbouring node and transit link.

As will be apparent to those skilled in the art, after a transit link is established at 188, control packets may be sent in either direction, in accordance with the 802.11 protocol, for example. Network nodes may also exchange data packets in either direction at this time if any are available and they choose to do so. Allowing an exchange of available data packets in either direction is generally preferred, as it makes more efficient use of a transit link by sharing the overhead required for link set-up.

The operations at steps 192 and 194 are optional, and relate to networks in which nodes are enabled for self discovery. At 192, a determination is made as to whether a packet was received from a new network node, and if so, then the network node and the new network node negotiate the entry of the new network node onto the network.

After receive operations on the transit link, and the determination and negotiation at 192 and 194 if applicable, are complete, the network node reverts back to neighbourhood mode at 184.

In the example method 180, neighbourhood mode is time-limited, as shown at 186. Those skilled in the art will appreciate that time limiting is but one possible scheme to provide for a transition from neighbourhood mode in the absence of incoming signals on a transit link. In another embodiment, the network node detects receipt of traffic to be transmitted to another network node, from a wireless terminal via an access link, for example, and enters traffic mode in response to the detection. As described in further detail below, the provision of a neighbourhood mode timer, either in conjunction with or instead of other operating mode transition triggers, may be preferred where network nodes are enabled for discovery functions or to enable certain types of error processing techniques.

When a neighbourhood mode timeout period expires, as determined by a neighbourhood mode timer, for example, the method proceeds to 196 to determine whether the network node has a new or pending packet to send. Where the network node is configured to exit the neighbourhood mode upon receipt of traffic on an access link, for example, processing may advance to 196 before the neighbourhood mode timer expires.

If the network node has traffic, illustratively a packet in FIG. 8, to send via a transit link, then it enters the traffic mode. An intended receiving network node is determined and an appropriate beam for sending the packet is selected at 198. A communications control signal, a packet request in FIG. 8, is then sent to the intended receiving network node at 200. Where the packet request is granted by the intended receiving node, as determined at 202, the packet is sent at 204. In a request/acknowledge scheme such as shown in FIG. 7, for instance, a positive determination at 202 is made based on the receipt of an acknowledgement from the intended receiving node, and a negative determination is made when no acknowledgement has been received within a predetermined time period.

If the packet request is not granted, then a random back-off timer is started at 208. The packet is then eventually retried after the back-off timer expires. In one embodiment, the random back-off timer sets the duration of a subsequent neighbourhood mode. Random back-off times between retries are generally preferred to avoid repeated collisions. Random retry back-off represents one possible delivery error processing scheme. Other back-off algorithms and other types of error handling procedures will be apparent to those skilled in the art.

The network node returns to the neighbourhood mode at 184 after the packet has been sent or delivery failure has been detected.

In a network node enabled for discovery functions, a time-limited neighbourhood mode provides a mechanism whereby the network node can detect loss of communications with a network. As described above, asynchronous communication networks do not continuously transmit or receive radio signals. Therefore, known network nodes for such networks may remain in neighbourhood mode, unaware that they are no longer connected in the network. Performing discovery operations at 206 when a neighbourhood mode timer has expired without receiving any communications control signals from other network nodes and the network node has no traffic to send may reduce the amount of time that a network node remains lost. If a network node does not hear any other network nodes before the neighbourhood timer expires, then it assumes that it is lost and executes discovery operations, described briefly above.

The above aspect of transit beam coordination based on neighbourhood mode/traffic mode transitions coordinates transit links among a group of distributed network nodes without the need for traditional synchronization. Such coordination enables the network nodes to respond quickly, rather than at a regular scheduled time as in a synchronized system, when traffic is available on the various links. The network nodes also operate substantially independently, without complex synchronization processes, and adapt to changing traffic conditions and flows between the nodes. As such, higher transit link capacities, lower complexity, more robustness to interference, and lower costs relative to synchronized systems can be realized.

In accordance with another aspect of the invention, transit links are coordinated by scheduling contact between network nodes. Scheduled contact, also referred to herein as "rendezvous", provides support for traffic requiring QoS guarantees beyond typical best-effort service. This aspect can be considered an implementation of the rendezvous operation 130 of FIG. 6. In a preferred embodiment of this aspect of the invention, an arrangement is provided by which two network nodes mutually agree on a coordinated linkage for the exchange of traffic. Unlike known synchronized communication networks, transit link coordination by scheduled contact does not require synchronization across an entire network or polling of neighbouring network nodes. Scheduled contact coordination is also more efficient by virtue of its adaptation to recent traffic flows in the network. This type of transit link coordination may be implemented in asynchronous communication networks, such as those using 802.11-based schemes.

The scheduling of data exchange between nodes may also ensure that no network nodes are blocked from sending traffic because of traffic on other network nodes, and that no network nodes are lost to the network, due to interference in the links, for instance. Local, per-link coordination according to the techniques disclosed herein neither burdens other links with coordination operations nor affects their ability to respond to other traffic.

In order to simplify contact scheduling, network nodes are preferably arranged in a hierarchy. For any transit link, one network node is designated as "master" and the other is designated as "slave". While there are many techniques for developing a hierarchy in a multi-hop network scenario, one example technique is for nodes that are closer to a main communications network access point such as the NAP 10 in FIG. 1 to be considered higher in the hierarchy than those further out. If there is no network connection, such as where the network is operating as a local area network, then network nodes with the most transit link connectivity are preferably considered higher. If linked network nodes have the same level in the hierarchy, then they may designate master or slave based on random choice or some other convenient technique. A network node designation may also be different for different transit links, such that a single network node may be a master of some of its transit links and a slave on others. The present invention is in no way dependent upon or limited to any particular hierarchical scheme used to designate master and slave nodes.

The master network node is responsible for selecting a rendezvous time and for transmitting an initial signal, such as an RTS packet or a CTS packet, to the slave network node at the rendezvous time. The slave node is responsible for listening to receive the transmission from the master network node at the rendezvous time.

Although time-of-day rendezvous times are possible, rendezvous times are preferably relative to current transmission time to avoid any requirement for accurate clock synchronization between network nodes. In other embodiments, the master network node and the slave network node negotiate the next rendezvous time, or use a default rendezvous time. It is also contemplated that one of a plurality of rendezvous time determination techniques is selected based on the result of a current rendezvous operation. For example, in one embodiment, rendezvous times are selected by the master network node unless neither the master network node nor the slave network node have traffic to send to each other during a current rendezvous operation, in which case a default rendezvous time is used as the next rendezvous time.

At the end of any communication with a slave network node, including data transfer, rendezvous, or other communications over a transit link, a master network node preferably negotiates a rendezvous time for subsequent contact. This process involves the exchange of packets between the master and slave in which the master network node suggests a time for the rendezvous, as well as a channel frequency, transmission beam, polarization and other transit link parameters as necessary, such as where such parameters have changed from previous assignments. The rendezvous time may be set, for example, at any mutually convenient time in the future to suit expected traffic patterns. Rendezvous times need not necessarily be the same for all master-slave pairings throughout a network. Multiple rendezvous times may also be negotiated. For example, the network nodes may agree to rendezvous by default 10 milliseconds after each packet exchange. The network nodes may also agree on a further rendezvous time if the network nodes fail to connect at the next rendezvous time. This further rendezvous may optionally be on a different radio channel or polarization or use an otherwise different radio system parameter set from that established for the preceding "missed" rendezvous.

Figure 9:
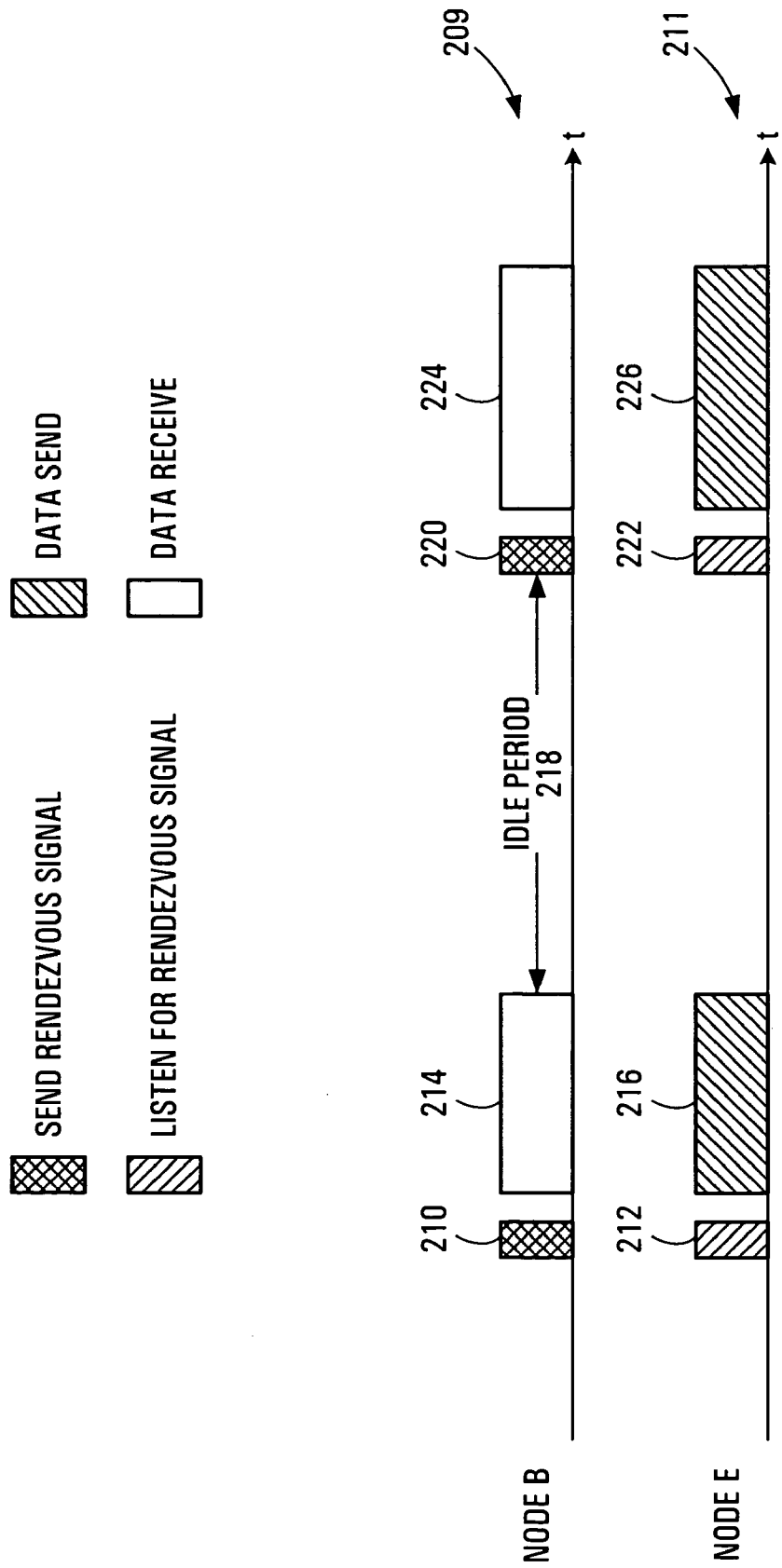
FIG. 9 is a timing diagram showing network node rendezvous operations in accordance with an embodiment of the invention.

FIG. 9 is a timing diagram showing network node rendezvous operations in accordance with an embodiment of the invention. The network node designations used in FIG. 9 correspond to those shown in FIG. 5. In FIG. 9, node B is illustratively master of its transit link with node E. As will be apparent, the timing diagram of FIG. 9 relates to one specific example of a rendezvous operation between two network nodes, in which the master node B has no packets to send to the slave node E. Although rendezvous operations are substantially the same for other network node conditions, signal patterns associated with such other conditions may vary from the signal patterns 209 and 211 shown in FIG. 9.

At a prearranged rendezvous time selected by the master network node B as previously agreed between network nodes B and E, node B transmits a signal 210 to node E, which is listening for the transmission from node B as indicated at 212. In a packet-based network, the signal is preferably a CTS packet or an RTS packet.

If the master node B has no packets to send, as is assumed for illustrative purposes for FIG. 9, the master node B sends a CTS packet or some other communications control signal to ask for packets or data from the slave node E. The master node B then listens for the packets or data from the slave node E at 214, using the negotiated link parameters, and the slave node E transmits its packets or data at 216. Although not specifically shown in FIG. 9, depending on the transit link protocol for example, node B, as receiving node, may also send signals such as acknowledgements to node E. Also, upon completion of the data exchange 214/216, the master node B selects, or the master node B and the slave node E negotiate, a next rendezvous time and transit link parameters. Both nodes B and E then enter an idle period 218.

In the idle period 218, the network nodes B and E preferably operate asynchronously as described above. Therefore, it should be appreciated that while the network nodes B and E are "idle" in the context of rendezvous operations, they may exchange data with each other and with other nodes during asynchronous operation intervals within idle periods. In this manner, network nodes B and E may exchange data at any time prior to the next rendezvous time, where data is received from a wireless terminal or another network node, for example. If such a data exchange between network nodes B and E takes place, then the next rendezvous time is preferably re-negotiated. Hence, a rendezvous time may be postponed and never actually be used, depending upon traffic flows between network nodes B and E during asynchronous operation intervals in idle periods.

After the idle period 218, which may include rendezvous time re-calculation or negotiation and asynchronous operation, nodes B and E rendezvous at 220, 222, 224, and 226, as described above. As described above, asynchronous operations are preferably resumed after rendezvous, during a rendezvous idle period.

Different traffic conditions than those assumed for FIG. 9, specifically that the master node B has no traffic to send to the slave node E, may exhibit different signal patterns than 209 and 211. If the master node B has packets to send to the slave node E, for example, then it sends an RTS packet or an analogous control signal to the slave node E at the rendezvous time. Where the slave node E grants the request, it responds with a CTS packet or equivalent control signal. The master node B then sends its traffic packets to the slave node E. The CTS packet sent by the slave node E in response to the RTS packet from the master node B may include an indication that the slave has packets to send. In this instance, packets from the slave node E are then transmitted to the master node B. A next rendezvous time, and possibly transit link parameters, are selected or negotiated after data exchange between the nodes B and E is complete.

If neither the master node B nor slave node E has traffic to send over the transit link, then the rendezvous operation includes the master node B sending a rendezvous signal, illustratively an RTS packet, including an indication that it has no traffic to send, and the slave node E responding with a rendezvous response signal, such as a CTS packet, including an indication it has no packets to send. At the conclusion of the rendezvous signal and rendezvous response signal exchange, a new rendezvous time, and possibly link parameters, are selected or negotiated.

Any of a variety of timing schemes may be employed in connection with appropriate synchronization of network nodes. In one preferred embodiment, each network node maintains its own clocking function, with the master network node including a time indicator as an element of a packet or other transmission the slave network node. Upon receipt of such a time indicator, the slave network node recognizes any difference between its clocking and that of the master network node, and notes any such timing difference in appropriate memory for reconciliation its sense of time with respect to the prescribed rendezvous time established between the nodes. In other embodiments, a clocking function is maintained centrally, or obtained from an external source such as the global positioning system (GPS).

Figure 10:
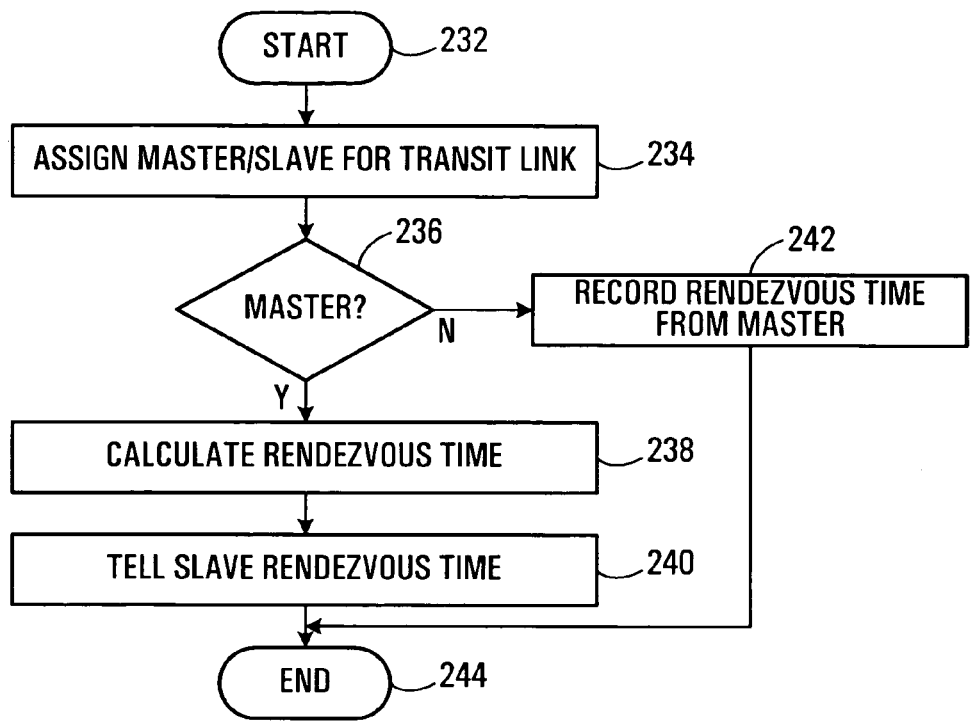
FIG. 10 is a flow diagram of a method of coordinating rendezvous time according to an embodiment of the invention.

FIG. 10 is a flow diagram of a method of coordinating rendezvous time according to an embodiment of the invention. The method starts at 232, at the end of a data exchange or a current rendezvous operation, for example. The assignment of master and slave status at 234 is preferably static after an initial assignment, although it may be dynamically reassigned afterwards to accommodate changing traffic patterns or network topology.

At 236, each network node on the transit link for which rendezvous time is being selected determines whether it is the master network node or the slave network node. The master network node calculates the rendezvous time at 238, based on expected or observed traffic patterns or a default rendezvous time, for example, and transmits the rendezvous time to the slave network node at 240, which is listening for a communication of the next rendezvous time from the master node while the rendezvous time is being calculated. The slave network node records the rendezvous time from the master node at 242, and rendezvous coordination is complete at 244.

Although not shown explicitly in FIG. 10, transit link parameters may also be determined at 238 and sent to the slave network node at 240.

The flow diagram of FIG. 10 illustrates a master network node calculation or selection of rendezvous time. In embodiments in which rendezvous times are negotiated, both the master network node and the slave network node participate in rendezvous time determination at 238, with the master network node preferably having precedence during rendezvous time negotiation.

Figure 11:
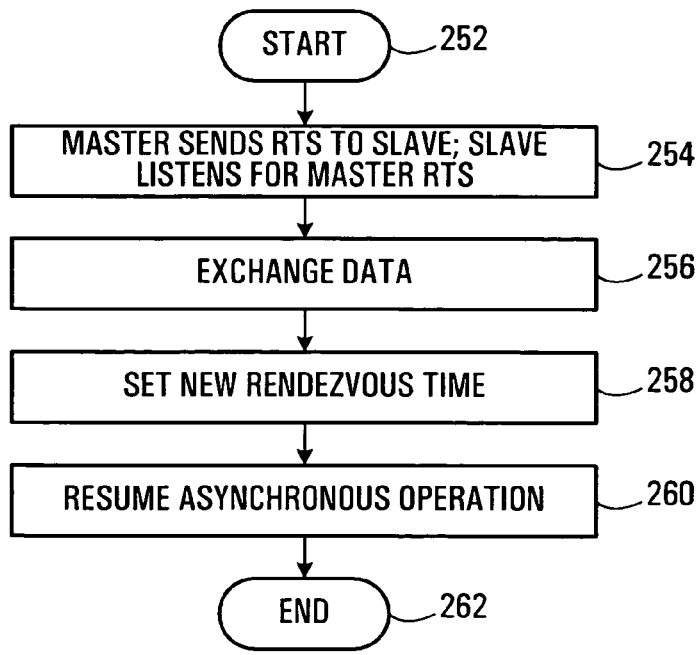
FIG. 11 is a flow diagram of a method of performing a rendezvous between network nodes in accordance with an embodiment of the invention.

FIG. 11 is a flow diagram of a method of performing a rendezvous between network nodes in accordance with an embodiment of the invention, and provides a more general representation of a rendezvous operation than the timing diagram of FIG. 9.

The method starts at 252, at a previously arranged rendezvous time. At 254, the master network node sends a rendezvous signal, illustratively an RTS packet, to the slave network node, which is listening for the RTS packet from the master. At 256, data is exchanged between the master network node and the slave network node, in either or both directions on the transit link, depending upon traffic. Where neither the master network node nor the slave network node has traffic to transmit, the exchange at 256 may consist of a rendezvous response signal such as a CTS packet from the slave network node to the master network node indicating that the slave network node has no traffic to transmit. At the conclusion of any data exchange at 256, a new rendezvous time is set at 258, as described above, and the master network node and the slave network node revert back to asynchronous operation at 260. The rendezvous is then complete, as indicated at 262. As in FIG. 10, new transit link parameters may also be determined at 258 along with the new rendezvous time.

Failure to receive a rendezvous response signal from a slave network node may be indicative of interference with the associated transit link, or that the slave network node has otherwise failed. The master network node may then initiate a re-discovery mode, described briefly above, and the slave awaits a new communication from the network. Similarly, if the slave network node does not receive a signal from the master network node at the rendezvous time or within a certain receive window of the rendezvous time, it may initiate self discovery operations, also briefly described above.

Network nodes may have multiple transit links, such that the loss of one link does not necessarily mean the loss of the network node from the network. If multiple connectivity exists between nodes, then with the loss of one transit link, the master network node may be able to send a signal, via others of its neighbours, to the slave network node with the lost transit link. Such an alternate communication path may be used, for example, to provide to the slave network node recovery information to be used to re-establish the transit link. Recovery information may include, for instance, a new channel frequency to use for the re-establishment, a rendezvous time, and the like. It is also contemplated that the slave network node may initiate transit link recovery in a similar manner through communications with the master network node.

Transit link coordination as disclosed herein provides wireless backhaul, and thereby supports adaptive high rate data service to high-traffic network "hot-spots" or selective areas. Handling of traffic with QoS parameters, such as Voice-over-IP and video services, is also enabled for asynchronous communication networks.

What has been described is merely illustrative of the application of the principles of the invention. Other arrangements and methods can be implemented by those skilled in the art without departing from the spirit and scope of the present invention.

For example, FIGS. 3 and 4 depict one illustrative antenna system architecture for the transit radio links of a network node, comprising a number of directional antennas and an omni-directional antenna. During a normal traffic mode of operation when exchanging traffic between network nodes, a beam antenna is selected, depending on which transit link is used. However, when a network node has no traffic to send, it enters a neighbourhood mode, and the omni-directional antenna is selected. Using the omni-directional antenna allows the network node to monitor all of its neighbours at the same time for a given frequency. In other embodiments, the omni-directional antenna functionality, or a portion thereof, is accomplished by switching sequentially between individual directional antennas, in an array antenna for example, and hence scanning among all the neighbours. In such embodiments, it is only necessary for a network node to scan a subset of the directional antenna elements in an array antenna to efficiently receive traffic from all the necessary directions, because there is normally directional overlap of beams from adjacent direction antenna elements and the direction of the neighbours is known.

In addition, it should be appreciated that transit link coordination functions, like many other network node functions, are preferably implemented primarily in software executable by a processor at a network node. As such, existing network nodes may be enabled for transit link coordination with only a software upgrade. Wherever necessary, a suitable network node antenna system may also be installed.

Also, in relation to FIG. 1, the invention is not restricted to networks that have a wired or wireless connection to a wired communication network or any other wider area communication network. All of the aspects of the invention can be applied to a network that is an isolated group of network nodes.

It should be noted that, while network nodes have been described above in the context of fixed units that are distinct from user terminals, the network node and transit link functionality of the invention can also be included within the user terminals and thus be mobile or nomadic. The two need not be disjoint.

The techniques of the invention are similarly not restricted to network nodes that are fixed in location. The network nodes themselves can be mobile, in which case they provide their functionality while in motion and designated as mobile network nodes. Alternatively, the nodes can be switched off at one location, transported, turned on and discovered in another location, and thus designated as nomadic network nodes.

In addition, if two or more network nodes are beyond their range of coverage to communicate, mobile or nomadic nodes, sometimes better known as wireless terminals, can function as relays using the coordination and traffic management techniques of the invention in single or multiple hops to allow the network nodes to extend their coverage or range.

Similarly, if a mobile user terminal is not within the reach of any network node, then the mobile user can use another mobile node or other mobile user terminals as relays to provide single or multiple hops to reach the network node using the coordination and traffic management techniques of the invention.

What is claimed is:

1. A method in a wireless network node of coordinating a transit link between network nodes in a wireless communication network, comprising:

monitoring a plurality of transit links between the network node and a respective plurality of neighbouring network nodes for a communications control signal from any of the plurality of neighbouring network nodes;

receiving the communications control signal from one of the plurality of neighbouring network nodes;

selecting one of the plurality of transit links between the network node and the one of the plurality of neighbouring network nodes;

exchanging data between the network node and the one of the plurality of neighbouring network nodes via the one of the plurality of transit links; and setting a rendezvous time between the network node and the one of the plurality of neighbouring network nodes upon completion of the exchanging.

2. The method of claim 1, further comprising: reverting to monitoring the plurality of transit links upon completion of the exchanging.

3. The method of claim 1, wherein monitoring comprises operating the network node in a neighbourhood mode to listen for the communications control signal from any of the plurality of neighbouring network modes, and exchanging comprises operating the network node in a traffic mode.

4. The method of claim 3, wherein operating the network node in a neighbourhood mode comprises operating a first antenna at the network node, and wherein operating the network node in a traffic mode comprises operating a second antenna at the network node.

5. The method of claim 3, wherein operating the network node in a neighbourhood mode comprises operating a plurality of antenna elements of an antenna system at the network node, and wherein operating the network node in a traffic mode comprises operating one of the plurality of antenna elements in the antenna system at the network node.

6. The method of claim 1, wherein the communications control signal is a "request-to-send" packet.

7. The method of claim 6, wherein the data comprises a "clear-to-send" packet.

8. The method of claim 3, further comprising:
transitioning to the traffic mode when the network node has data to send.

9. The method of claim 1, further comprising:
performing access traffic functionality to send data to and to receive data from wireless terminals.

10. The method of claim 3, further comprising:
performing access traffic functionality to send data to and to receive data from wireless terminals; and
transitioning to the traffic mode when the network node has data, received from a neighbouring network node or a wireless terminal, to send to another network node.

11. The method of claim 3, further comprising:
transitioning to the traffic mode when a neighbourhood mode timeout expires.

12. The method of claim 1, wherein setting a rendezvous time comprises:
assigning the network node as one of a master network node and a slave network node for the one of the plurality of transit links;
where the network node is the master network node:
calculating the rendezvous time; and
sending the rendezvous time to the one of the plurality of neighbouring network nodes; and
where the network node is the slave network node:
receiving the rendezvous time from the one of the plurality of neighbouring network nodes.

13. The method of claim 12, wherein calculating the rendezvous time comprises calculating the rendezvous time based on expected data traffic over the transit link.

14. The method of claim 13, wherein calculating the rendezvous time comprises calculating the rendezvous time based on observed data traffic over the transit link.

15. The method of claim 12, wherein calculating the rendezvous time comprises calculating the rendezvous time based on negotiation between the network node and the one of the plurality of neighbouring network nodes.

16. The method of claim 1, wherein setting the rendezvous time comprises setting a default rendezvous time as the rendezvous time.

17. The method of claim 1, further comprising:
setting rendezvous transit link parameters upon completion of the exchanging.

18. The method of claim 12, further comprising, where the network node is the master network node:
reverting to monitoring the plurality of transit links upon completion of sending the rendezvous time; and
sending a rendezvous signal to the one of the plurality of neighbouring network nodes via the one of the plurality of transit links at the rendezvous time.

19. The method of claim 18, further comprising, where the network node is the slave network node:
receiving the rendezvous signal from the one of the plurality of neighbouring network nodes; and
sending a rendezvous response signal to the one of the plurality of neighbouring network nodes via the one of the plurality of transit links.

20. The method of claim 19, further comprising:
exchanging data via the transit link in response to the rendezvous response signal.

21. The method of claim 18, further comprising, where the network node is the master network node:
determining whether the network node has data traffic to send to the one of the plurality of neighbouring network nodes; and
including in the rendezvous signal an indication of whether the master network node has data traffic to send to the one of the plurality of neighbouring network nodes.

22. The method of claim 19, further comprising, where the network node is the slave network node:
determining whether the network node has data traffic to send to the one of the plurality of neighbouring network nodes; and
including in the rendezvous response signal an indication of whether the network node has data traffic to send to the one of the plurality of neighbouring network nodes.

23. The method of claim 21, wherein the rendezvous signal comprises a "request-to-send" (RTS) packet where the network node has data traffic to send, and wherein the rendezvous signal comprises a "clear-to-send" (CTS) packet where the network node has no data traffic to send.

24. The method of claim 23, further comprising, where the network node is the slave network node:
receiving the rendezvous signal from the one of the plurality of neighbouring network nodes;
sending a CTS packet to the one of the plurality of neighbouring network nodes where the rendezvous signal comprises an RTS packet; and
sending data traffic to the one of the plurality of neighbouring network nodes where the rendezvous signal comprises a CTS packet.

25. The method of claim 18, further comprising:
receiving the communications control signal from the one of the plurality of neighbouring network nodes after setting the rendezvous time;
selecting the one of the plurality of transit links;
exchanging data over the one of the plurality of transit links; and
re-calculating a new rendezvous time.

26. The method of claim 1, wherein the monitoring is performed for at least one of the plurality of transit links at a respective predetermined rendezvous time.

27. A network node for an asynchronous communication network, comprising:
a transit link antenna system;
a transit radio connected to the transit link antenna system and configured to communicate with neighbouring network nodes over transit links using the transit link antenna system; and
a communications controller configured to operate the network node in a plurality of operating modes, comprising:
a neighbourhood mode to listen for communications control signals from any of the neighbouring network nodes,
a traffic mode to select one of the transit links and to exchange data with one of the neighbouring network nodes over the one of the transit links in response to a communications control signal from the one of the neighbouring network nodes; and
a rendezvous mode to exchange data with the neighbouring network nodes at respective predetermined rendezvous times.

28. The network node of claim 27, wherein the communications controller is further configured to operate the network node in the traffic mode when the network node has data to send to any of the neighbouring network nodes.

29. The network node of claim 27, wherein the transit link antenna system comprises a neighbourhood mode antenna and a traffic mode antenna, each having a respective defined beam pattern.

30. The network node of claim 29, wherein the transit link antenna system further comprises:
a feeding port;
an antenna selection switch connected to the feeding port, the neighbourhood mode antenna, and the traffic mode antenna, and configured to switch excitation signals between the feeding port and either the neighbourhood mode antenna or the traffic mode antenna responsive to a control signal from the communications controller.

31. The network node of claim 30, wherein the neighbourhood mode antenna comprises an omni-directional antenna, wherein the traffic mode antenna comprises an array antenna having a plurality of directional antenna elements, and wherein each of the transit links is associated with one of the plurality of directional antenna elements.

32. The network node of claim 31, wherein the transit link antenna system further comprises:
an antenna beam selection switch connected to the antenna selection switch and to each of the plurality of directional antenna elements and configured to switch excitation signals between the antenna selection switch and the one of the plurality of directional antenna elements associated with the one of the transit links responsive to a beam selection signal from the communications controller.

33. The network node of claim 27, wherein the transit link antenna system comprises an array antenna having a plurality of directional antenna elements, each of the transit links being associated with one of the plurality of directional antenna elements, and wherein the communications controller operates more than one of the plurality of directional antenna elements in the neighbourhood mode and selects one of the plurality of directional antenna elements in the traffic mode.

34. The network node of claim 27, wherein the transit link antenna system comprises an array antenna having a plurality of directional antenna elements, each of the transit links being associated with phase shifts applied to excitation signals of the directional antenna elements to steer a peak in a gain pattern of the array antenna toward a respective one of the neighbouring network nodes in the traffic mode.

35. The network node of claim 27, wherein the rendezvous time and rendezvous transit link parameters for each neighbouring node are set after completion of a data exchange between the network node and the neighbouring node.

36. The network node of claim 35, wherein the communications controller switches the network node from the traffic mode to the neighbourhood mode upon completion of a data exchange.

37. The network node of claim 36, wherein the communications controller switches the network node from neighbourhood mode to rendezvous mode at the rendezvous time.

38. A communication network comprising a plurality of network nodes as claimed in claim 27.

39. A system for coordinating a transit link between network nodes in an asynchronous communication network, comprising:
    means for monitoring a plurality of transit links between a network node and a respective plurality of neighbouring network nodes for a communications control signal from any of the plurality of neighbouring network nodes;
    means for receiving the communications control signal from one of the plurality of neighbouring network nodes;
    means for selecting the one of the plurality of transit links between the network node and the one of the plurality of neighbouring network nodes;
    means for exchanging data between the network node and the one of the plurality of neighbouring network nodes via the one of the plurality of transit links; and
    means for establishing contact between the network node and the plurality of neighbouring network nodes at respective scheduled contact times.

40. The system of claim 39, wherein the means for selecting selects the one of the plurality of transit links based on an identification of the one of the plurality of neighbouring network nodes in the communications control signal and a lookup table mapping the plurality of transit links to the plurality of neighbouring network nodes.

41. In a network node of a wireless communication network, a method of coordinating a transit link between the network node and a neighbouring network node in the wireless communication network, comprising:
    assigning the network node as either a master network node or a slave network node for the transit link;
    where the network node is the master network node:
        scheduling a rendezvous time for the transit link;
        transmitting the rendezvous time to the slave network node for the transit link; and
        transmitting a rendezvous signal to the slave network node at the rendezvous time; and
    where the network node is the slave network node:
        receiving the rendezvous time from the master network node for the transit link;
        listening to receive the rendezvous signal at the rendezvous time; and
        transmitting a rendezvous response signal to the master network node upon receiving the rendezvous signal.

42. The method of claim 41, wherein the network node has a plurality of neighbouring network nodes in the wireless communication network.

43. The method of claim 42, wherein the method is repeated for each transit link between the network node and the plurality of neighbouring network nodes.

44. The method of claim 41, wherein the rendezvous signal includes an indication of whether the master network node has data traffic to send to the slave network node, and wherein the rendezvous response signal includes an indication of whether the slave network node has data traffic to send to the master network node, further comprising:
    exchanging data traffic over the transit link where the master network node has data traffic to send to the slave network node or where the slave network node has data traffic to send to the master network node.

45. The method of claim 44, wherein the method is repeated upon completion of the exchanging.

46. A wireless network comprising a plurality of wireless network nodes, each wireless network node comprising:
    a respective access radio and omni-directional access antenna providing communications services to mobile terminals;
    a respective transit radio and transit antenna system providing communications with other wireless network nodes, the transit antenna system having a plurality of antenna segments each producing a respective beam such that a 360 degree coverage is provided;
    a respective communications controller controlling communications between pairs of mobile terminals through the access radio and the access antenna system, controlling communications between a mobile station and another wireless network node through the access radio, the access antenna system, the transit radio, and a segment of the transit antenna system, and controlling communications from a first other wireless network node to a second other wireless network node through the transit radio and pairs of the segments of the transit antenna system,
    wherein each wireless network node further comprises an auxiliary antenna port and an antenna detector adapted to automatically detect whether or not an auxiliary antenna is coupled to the auxiliary antenna port, wherein the auxiliary antenna, when detected, is treated by the communications controller as a transit antenna segment, and wherein the auxiliary antenna has a greater gain than the transit antenna system segments.

* * * * *